(12) United States Patent
Umezaki et al.

(10) Patent No.: US 9,957,644 B2
(45) Date of Patent: May 1, 2018

(54) FIBER-FORMING COMPOSITION AND BIO-COMPATIBLE MATERIAL USING SAID FIBER

(71) Applicant: NISSAN CHEMICAL INDUSTRIES, LTD., Tokyo (JP)

(72) Inventors: Makiko Umezaki, Toyama (JP); Takahiro Kishioka, Toyama (JP); Taito Nishino, Shiraoka (JP); Ayako Otani, Shiraoka (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 14/915,219

(22) PCT Filed: Aug. 29, 2014

(86) PCT No.: PCT/JP2014/072679
§ 371 (c)(1),
(2) Date: Feb. 26, 2016

(87) PCT Pub. No.: WO2015/030153
PCT Pub. Date: Mar. 5, 2015

(65) Prior Publication Data
US 2016/0201226 A1     Jul. 14, 2016

(30) Foreign Application Priority Data

Aug. 30, 2013   (JP) .................................. 2013-180382

(51) Int. Cl.
*D01F 6/16*     (2006.01)
*C08F 220/00*   (2006.01)
(Continued)

(52) U.S. Cl.
CPC .............. *D01F 6/16* (2013.01); *C08F 220/20* (2013.01); *C08L 33/14* (2013.01); *D01D 5/003* (2013.01);
(Continued)

(58) Field of Classification Search
CPC . D01F 6/16; D01F 6/02; C08F 220/20; C08L 33/14; D01D 5/0007; D01D 5/003
(Continued)

(56) References Cited

U.S. PATENT DOCUMENTS

| | | |
|---|---|---|
| 4,997,714 A | 3/1991 | Farrar et al. |
| 2002/0009938 A1 | 1/2002 | Katayama et al. |

(Continued)

FOREIGN PATENT DOCUMENTS

| | | |
|---|---|---|
| CN | 1313414 A | 9/2001 |
| CN | 1469891 A | 1/2004 |

(Continued)

OTHER PUBLICATIONS

Ko et al., *Macromolecular Research*, 18(2): 137-143 (2010).
(Continued)

*Primary Examiner* — Kelechi Egwim
(74) *Attorney, Agent, or Firm* — Leydig, Voit & Mayer, Ltd.

(57) ABSTRACT

The invention provides a composition for the production of a fiber having organic solvent resistance, a fiber obtained by spinning the composition, and a biocompatible material containing the fiber. The composition contains (A) a polymer compound containing a unit structure represented by the formula (1)

(Continued)

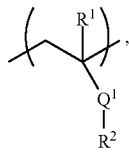

(1)

wherein each symbol is as described herein, (B) a crosslinking agent, (C) an acid compound, and (D) a solvent.

5 Claims, 6 Drawing Sheets

(51) Int. Cl.
  *C08L 33/14* (2006.01)
  *D01F 6/02* (2006.01)
  *D01D 5/00* (2006.01)
  *C08F 220/20* (2006.01)
  *D01D 10/02* (2006.01)
  *D04H 1/728* (2012.01)
  *C08L 33/26* (2006.01)

(52) U.S. Cl.
  CPC ............ *D01D 5/0007* (2013.01); *D01F 6/02* (2013.01); *C08L 33/26* (2013.01); *C08L 2203/12* (2013.01); *C08L 2312/00* (2013.01); *D01D 10/02* (2013.01); *D04H 1/728* (2013.01)

(58) Field of Classification Search
  USPC ....................................................... 524/558
  See application file for complete search history.

(56) References Cited

U.S. PATENT DOCUMENTS

| | | |
|---|---|---|
| 2002/0192468 A1 | 12/2002 | Choi |
| 2009/0076530 A1 | 3/2009 | Fukutomi et al. |
| 2009/0197199 A1 | 8/2009 | Ishizuka et al. |
| 2009/0202616 A1 | 8/2009 | Chong et al. |
| 2009/0318660 A1 | 12/2009 | Bos et al. |
| 2011/0136669 A1 | 6/2011 | Liebmann et al. |
| 2011/0275154 A1 | 11/2011 | Martin et al. |
| 2014/0045119 A1 | 2/2014 | Kishioka et al. |
| 2016/0266492 A1* | 9/2016 | Kishioka ................ D01D 5/003 |

FOREIGN PATENT DOCUMENTS

| | | |
|---|---|---|
| CN | 101019075 A | 8/2007 |
| CN | 101511938 A | 8/2009 |
| CN | 101560302 A | 10/2009 |
| CN | 101718004 A | 6/2010 |
| CN | 102176904 A | 9/2011 |
| CN | 102383215 A | 3/2012 |
| JP | S46-033132 B1 | 9/1971 |
| JP | S51-073587 A | 6/1976 |
| JP | 51123323 A * | 10/1976 |
| JP | S51-123323 A | 10/1976 |
| JP | H02-024361 A | 1/1990 |
| JP | 2008-514341 A | 5/2008 |
| JP | 2009-000100 A | 1/2009 |
| JP | 2012-067432 A | 4/2012 |
| JP | 2013-049927 A | 3/2013 |
| WO | WO 2002/026887 A2 | 4/2002 |
| WO | WO 2007/102606 A1 | 9/2007 |
| WO | WO 2012/141210 A1 | 10/2012 |

OTHER PUBLICATIONS

Kim et al., *Macromolecules*, 38: 3719-3723 (2005).
Wu et al., *Progress in Organic Coatings*, 36(1-2): 21-33 (1999).
Tianjin University, "Study on Copolymethacrylate Fibers with Three-Dimensional Network Structure and Oil Absorptive Properties," China Doctoral Dissertations and Masters' Theses Full-Text Database (Doctor), Engineering Science and Technology I, entry B016-4 (2005).
Chinese Patent Office, The Second Office Action in Chinese Patent Application No. 201480048111.8 (dated Aug. 29, 2017).

* cited by examiner

FIBER-FORMING COMPOSITION AND BIO-COMPATIBLE MATERIAL USING SAID FIBER

CROSS-REFERENCE TO RELATED APPLICATIONS

This patent application is the U.S. national phase of International Patent Application No. PCT/JP2014/072679, filed Aug. 29, 2014, which claims the benefit of Japanese Patent Application No. 2013-180382, filed on Aug. 30, 2013, which are incorporated by reference in their entireties herein.

TECHNICAL FIELD

The present invention relates to a composition for forming a fiber, which comprises a polymer compound containing a particular unit structure having a hydroxy group in a side chain, a crosslinking agent, an acid compound, and a solvent, a fiber superior in organic solvent resistance, which is obtained by spinning (preferably, further heating) the composition, and a biocompatible material comprising the fiber.

BACKGROUND ART

In recent years, an ultrafine fiber having a diameter of a nano meter order has been attracting attention, and is expected to be utilizable in various fields of battery●information, environment●energy, medical care (e.g., biocompatible material etc.)●welfare.

As a material for forming such ultrafine fiber, a wide variety of materials such as organic polymers (e.g., nylon and the like), inorganic substances (e.g., $TiO_2$, $SiO_2$ and the like), organism-derived polymers (e.g., cellulose, collagen and the like), and the like have been considered.

As a technique for spinning an ultrafine fiber having a diameter of a nano meter order, melt blow method, composite melt spinning method, electrospinning method and the like are known. Particularly, electrospinning method is attracting attention as a method capable of fibrosis of materials that could not be handled heretofore. For example, many medical polymers such as polylactic acid and the like, and water-soluble polymers such as polyvinyl alcohol and the like have been investigated in addition to the aforementioned organism-derived polymers such as cellulose, collagen and the like (patent documents 1-8, non-patent document 1).

On the other hand, as biocompatible materials such as cell culture scaffold material and the like, use of organism-derived materials (particularly, gelatin derived from bovine etc.) has been avoided in recent years due to safety problems, and production using non organism-derived materials (e.g., synthetic polymer etc.) has been desired.

Biocompatible materials such as cell culture scaffold material and the like require use of an organic solvent such as ethanol and the like for a sterilization treatment. When the above-mentioned ultrafine fiber is applied to the biocompatible materials, the fiber also needs to have resistance to organic solvents. In the above-mentioned patent documents and non-patent document, a method including crosslinking polymers by a crosslinking agent and the like are used as a means for improving durability of a fiber. However, when the kind of the polymer is different, crosslinking conditions vary, and a complicated treatment such as UV irradiation, hydrogen chloride gas treatment and the like is sometimes required (e.g., patent documents 3, 7 and non-patent document 1). Therefore, a method capable of producing a fiber having organic solvent resistance by a simple treatment alone (e.g., heat treatment alone, preferably, heat treatment at low temperature for short time alone) is desired.

DOCUMENT LIST

Patent Documents patent document 1: US2002/0192468A1
patent document 2: CN101718004A
patent document 3: JP-A-2013-49927
patent document 4: JP-A-2008-514341
patent document 5: WO 2007/102606A1
patent document 6: JP-A-2009-100
patent document 7: US2011/0275154A1
patent document 8: JP-A-2012-67432

Non-Patent Document non-patent document 1: Macromolecular Research (2010), 18(2), 137-143

SUMMARY OF THE INVENTION

Problems to be Solved by the Invention

An object of the present invention is to provide a composition for forming a fiber for the production of a fiber having organic solvent resistance, which can be produced conveniently, a fiber obtained by spinning the composition, and a biocompatible material containing the fiber.

Means of Solving the Problems

The present inventors have conducted intensive studies and found that a fiber produced by spinning a composition for forming a fiber, which contains a polymer compound containing a particular unit structure having a hydroxy group in a side chain, a crosslinking agent, an acid compound, and a solvent, is useful as a biocompatible material, since it has sufficient organic solvent resistance, and further, superior biocompatibility, which is the function of a cell culture scaffold as a specific one embodiment, which resulted in the completion of the present invention.

In the present invention, a polymer compound containing a particular unit structure having a hydroxy group in a side chain is spun together with a crosslinking agent and an acid compound, hydroxy groups undergo a crosslinking reaction via the crosslinking agent, and polymer compounds are crosslinked. As a result, a fiber having organic solvent resistance is produced.

The present inventors have found that a fiber produced by spinning the composition for forming a fiber of the present invention expresses more superior organic solvent resistance by applying a heat treatment.

Accordingly, the present invention is as described below.

[1] A composition for forming a fiber, comprising
(A) a polymer compound containing a unit structure represented by the formula (1),
(B) a crosslinking agent,
(C) an acid compound, and
(D) a solvent:

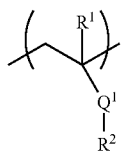

(1)

wherein
R¹ is a hydrogen atom or a methyl group,
Q¹ is an ester bond or an amide bond,
R² is an alkyl group having 1-10 carbon atoms or an aromatic hydrocarbon group having 6-10 carbon atoms, wherein at least one hydrogen atom is substituted by a hydroxy group.

[2] The composition of the above-mentioned [1], wherein the above-mentioned polymer compound has a weight average molecular weight of 1,000-1,000,000.
[3] The composition of the above-mentioned [1] or [2], wherein the above-mentioned solvent is a polar solvent.
[4] A production method of a fiber, comprising a step of spinning the composition of any one of the above-mentioned [1]-[3].
[5] The method of the above-mentioned [4], wherein the above-mentioned spinning is electrospinning.
[6] The method of the above-mentioned [4] or [5], comprising a step of heating a spun fiber at 70-300° C.
[7] A fiber produced by the method of any one of the above-mentioned [4]-[6].
[8] A biocompatible material comprising the fiber of the above-mentioned [7].
[9] A fiber comprising
(A) a polymer compound containing a unit structure represented by the formula (1),
(B) a crosslinking agent, and
(C) an acid compound:

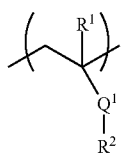

(1)

wherein
R¹ is a hydrogen atom or a methyl group,
Q¹ is an ester bond or an amide bond,
R² is an alkyl group having 1-10 carbon atoms or an aromatic hydrocarbon group having 6-10 carbon atoms, wherein at least one hydrogen atom is substituted by a hydroxy group.

Effect of the Invention

According to the present invention, a composition for forming a fiber, which is for the production of a fiber having organic solvent resistance which can be produced conveniently, a fiber obtained by spinning the composition, and a biocompatible material containing the fiber can be provided.

In addition, the composition for forming a fiber of the present invention can afford a fiber having organic solvent resistance even when spun after preservation at room temperature for not less than one week. Therefore, according to the present invention, a composition for forming a fiber, which is superior in room temperature preservation stability can also be provided.

Furthermore, a composition for forming a fiber, which is for the production of a fiber having a sufficient function as a cell culture scaffold, a fiber obtained by spinning the composition, and a biocompatible material containing the fiber can be provided.

DESCRIPTION OF EMBODIMENTS

1. Composition for Forming a Fiber

Figure 1:
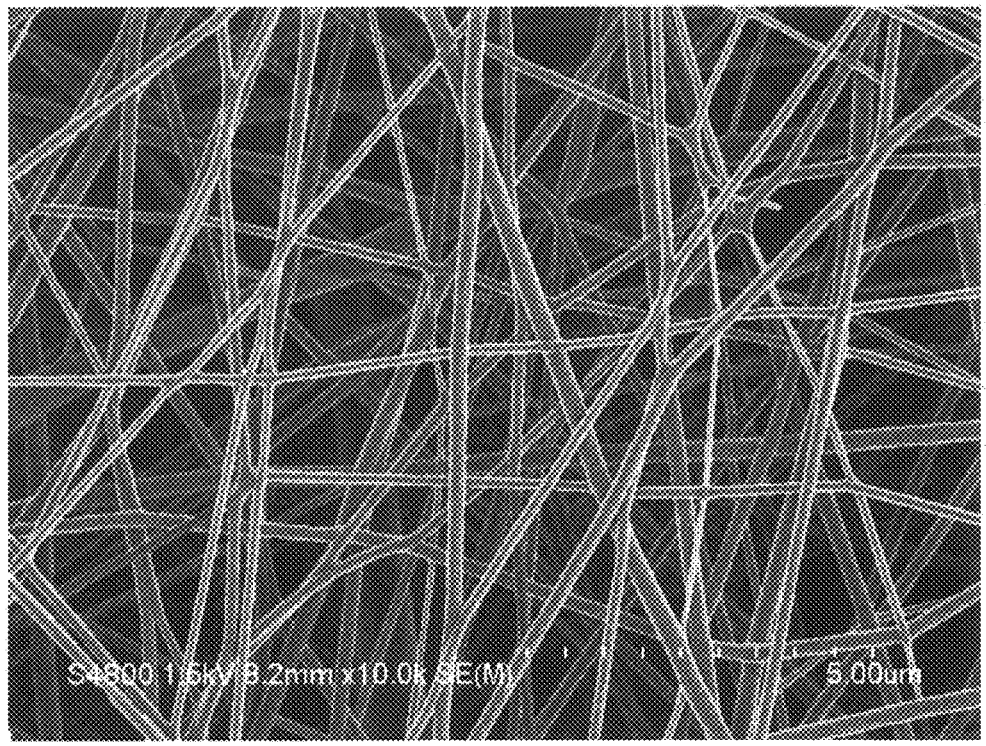
FIG. 1 is an SEM photograph of a fiber obtained from the composition for forming a fiber of Example 1, which was taken after a heat treatment at 110° C. for 24 hr.
Figure 2:
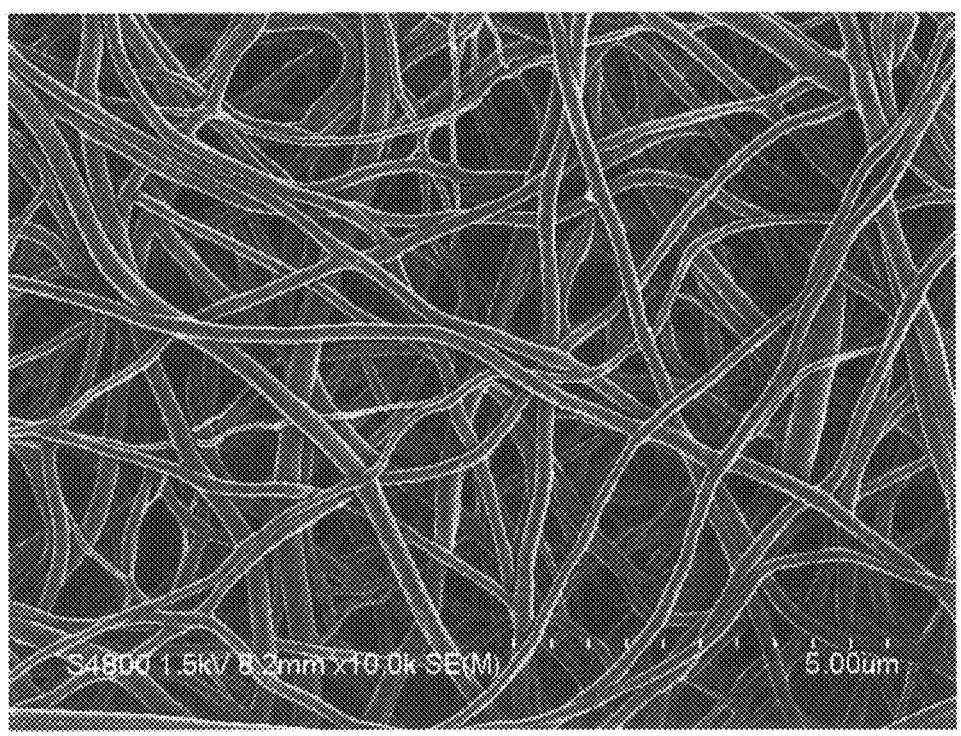
FIG. 2 is an SEM photograph of a fiber obtained from the composition for forming a fiber of Example 1, which was taken after a heat treatment at 110° C. for 24 hr and immersion in acetone.
Figure 3:
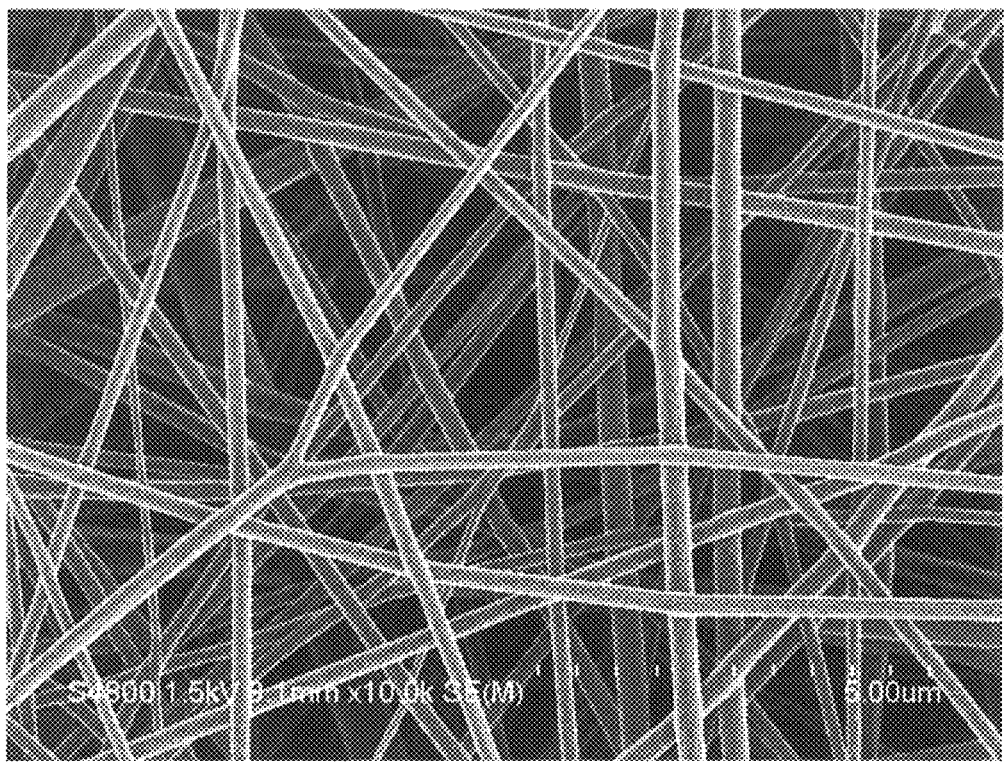
FIG. 3 is an SEM photograph of a fiber obtained from the composition for forming a fiber of Example 2, which was taken after a heat treatment at 180° C. for 10 min.
Figure 4:
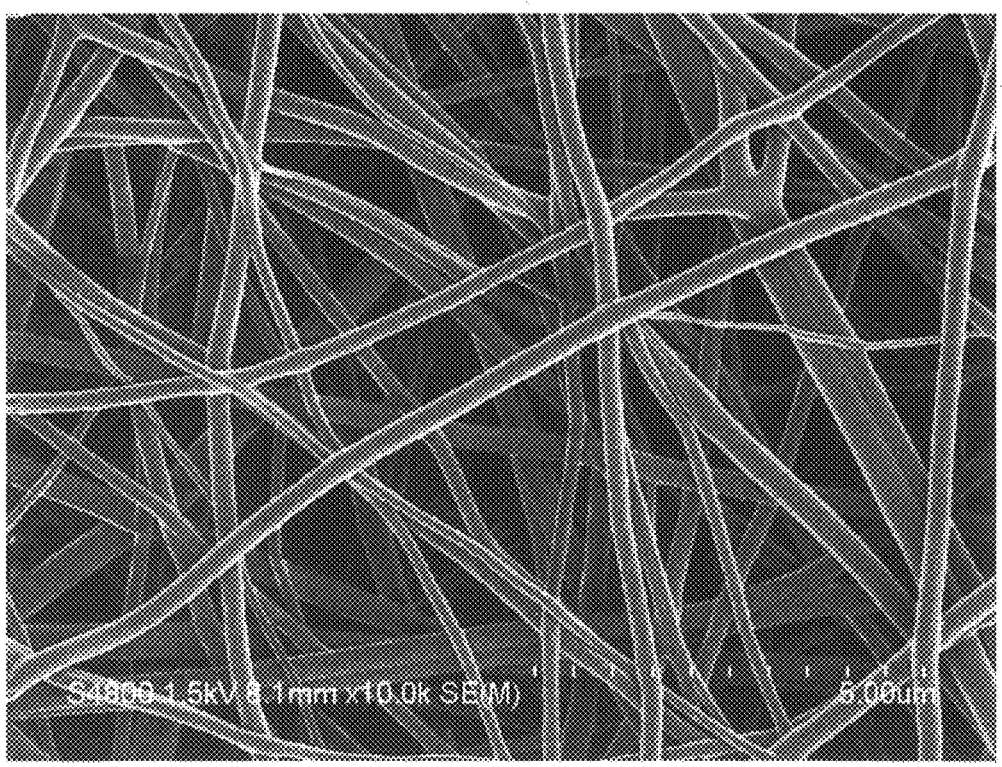
FIG. 4 is an SEM photograph of a fiber obtained from the composition for forming a fiber of Example 2, which was taken after a heat treatment at 180° C. for 10 min and immersion in acetone.
Figure 5:
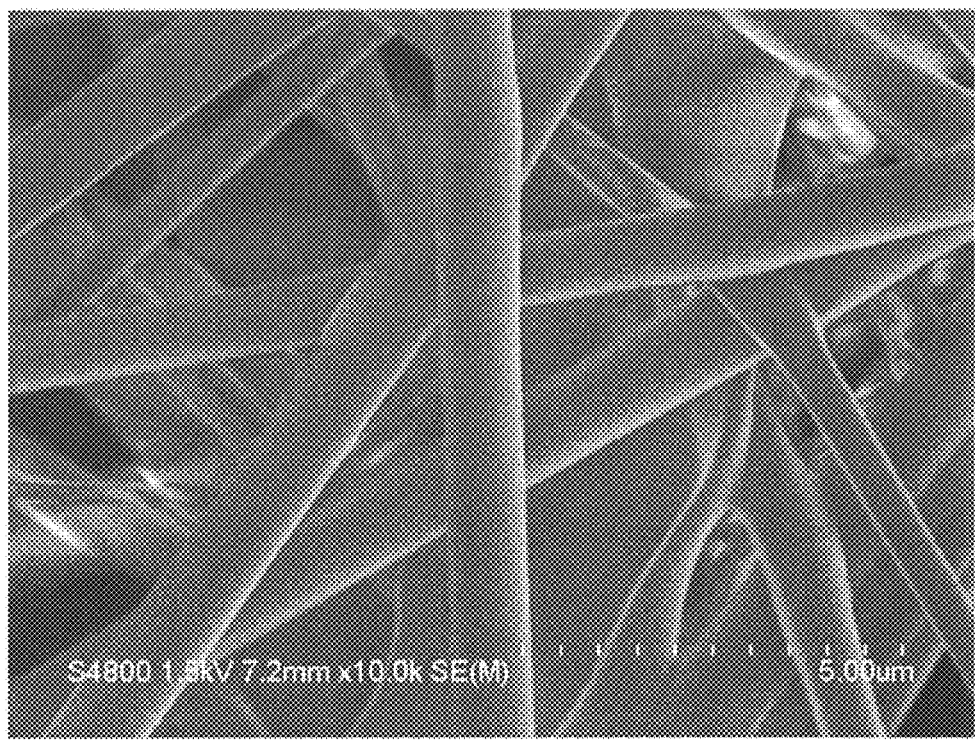
FIG. 5 is an SEM photograph of a fiber obtained from the composition for forming a fiber of Example 3, which was taken after a heat treatment at 180° C. for 30 min and immersion in acetone.
Figure 6:
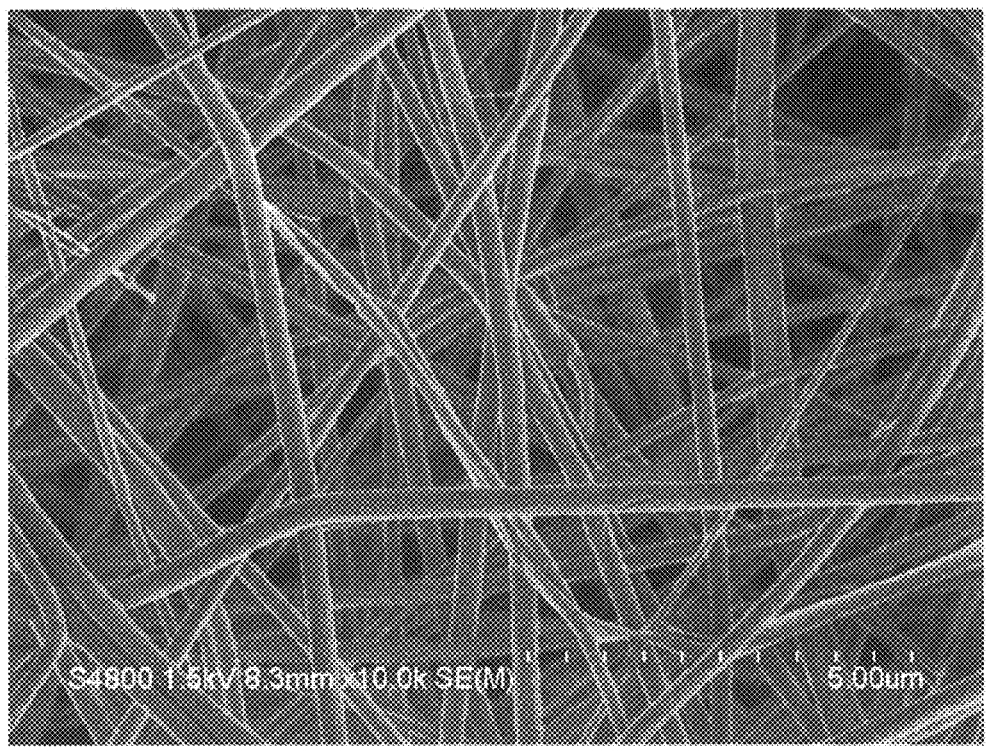
FIG. 6 is an SEM photograph of a fiber obtained from the composition for forming a fiber of Example 4, which was taken after a heat treatment at 180° C. for 30 min.
Figure 7:
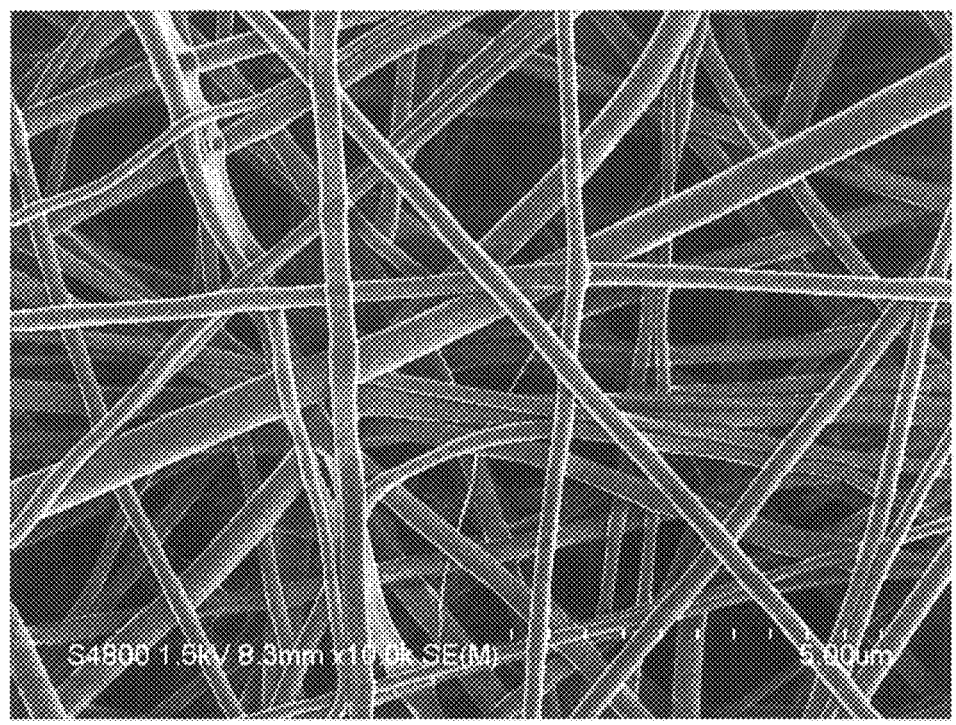
FIG. 7 is an SEM photograph of a fiber obtained from the composition for forming a fiber of Example 4, which was taken after a heat treatment at 180° C. for 30 min and immersion in acetone.
Figure 8:
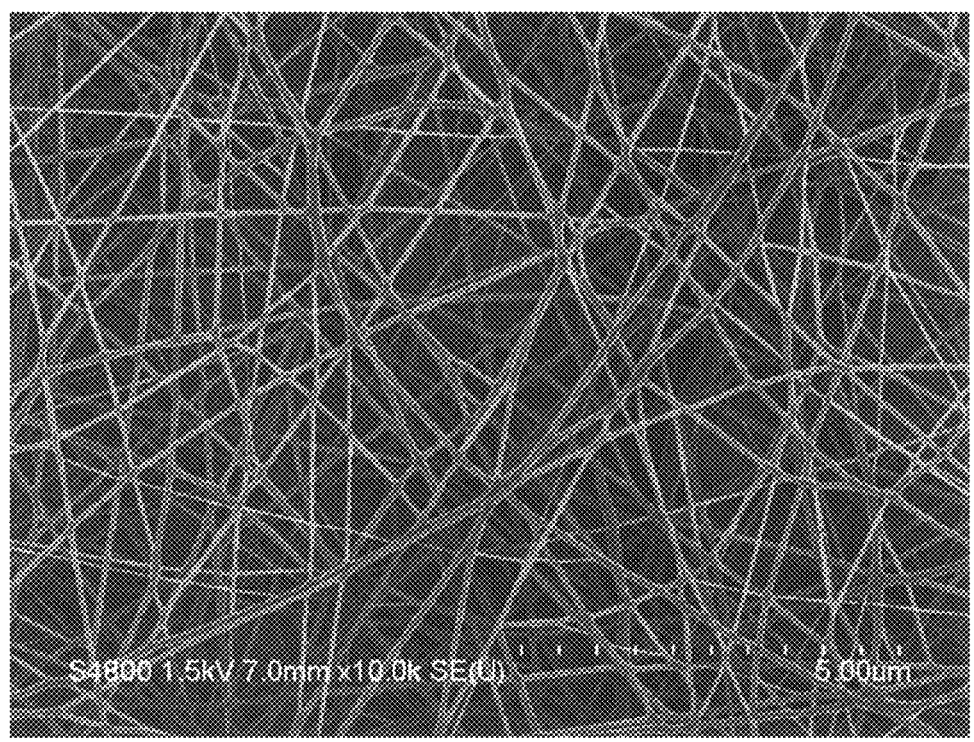
FIG. 8 is an SEM photograph of a fiber obtained from the composition for forming a fiber of Example 5, which was taken after a heat treatment at 110° C. for 10 min and immersion in acetone.
Figure 9:
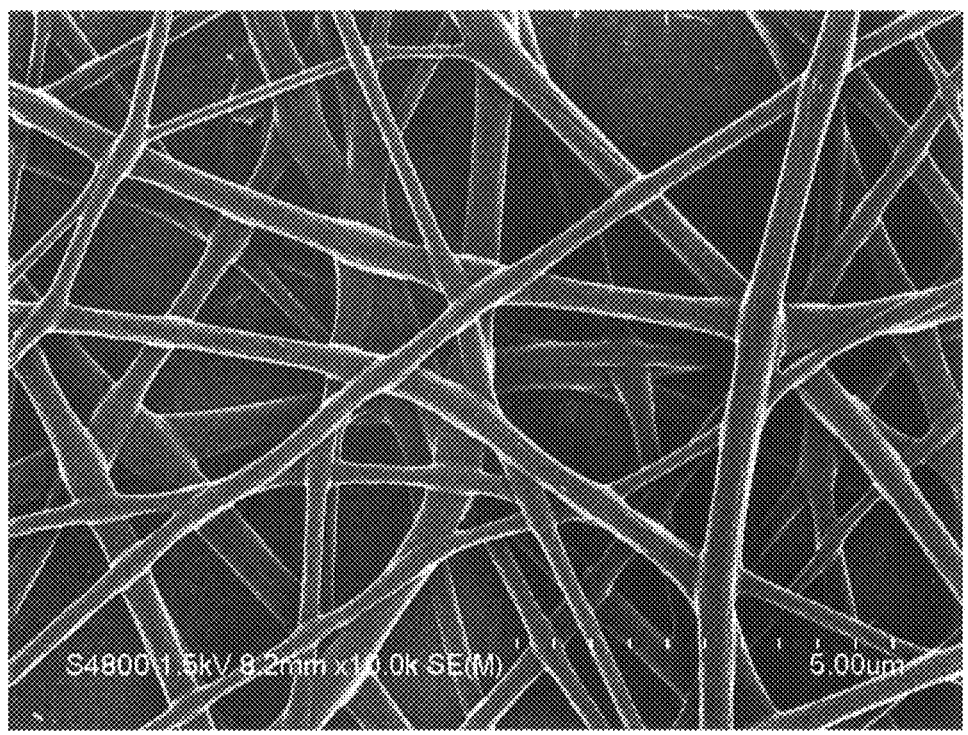
FIG. 9 is an SEM photograph of a fiber obtained from the composition for forming a fiber of Comparative Example 1, which was taken after a heat treatment at 180° C. for 10 min.
Figure 10:
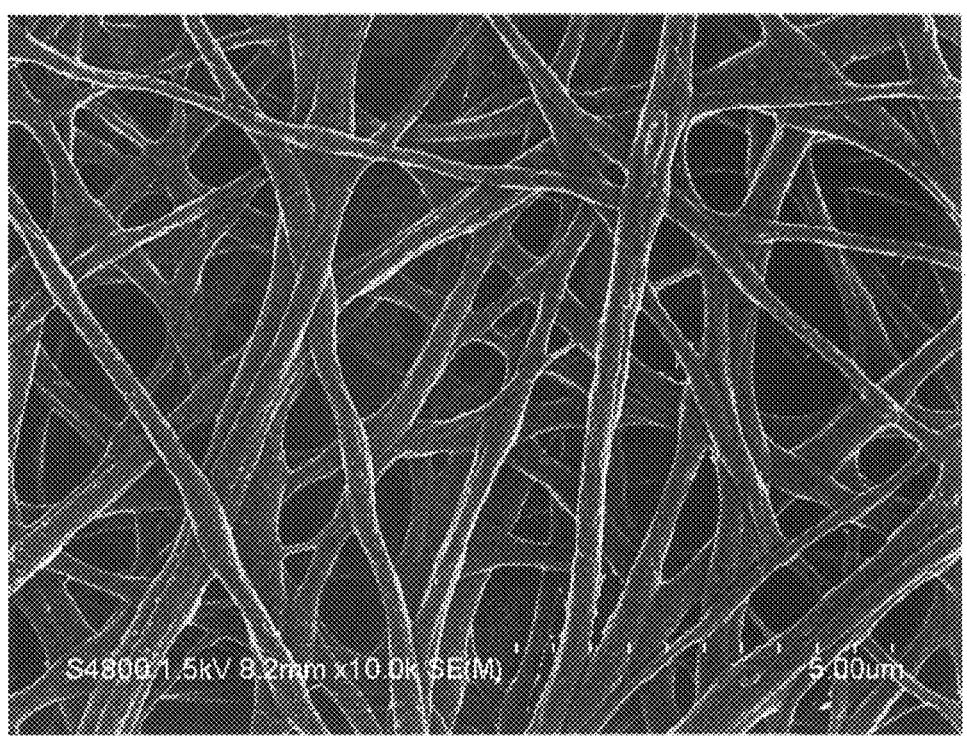
FIG. 10 is an SEM photograph of a fiber obtained from the composition for forming a fiber of Comparative Example 1, which was taken after a heat treatment at 180° C. for 10 min and immersion in acetone.
Figure 11:
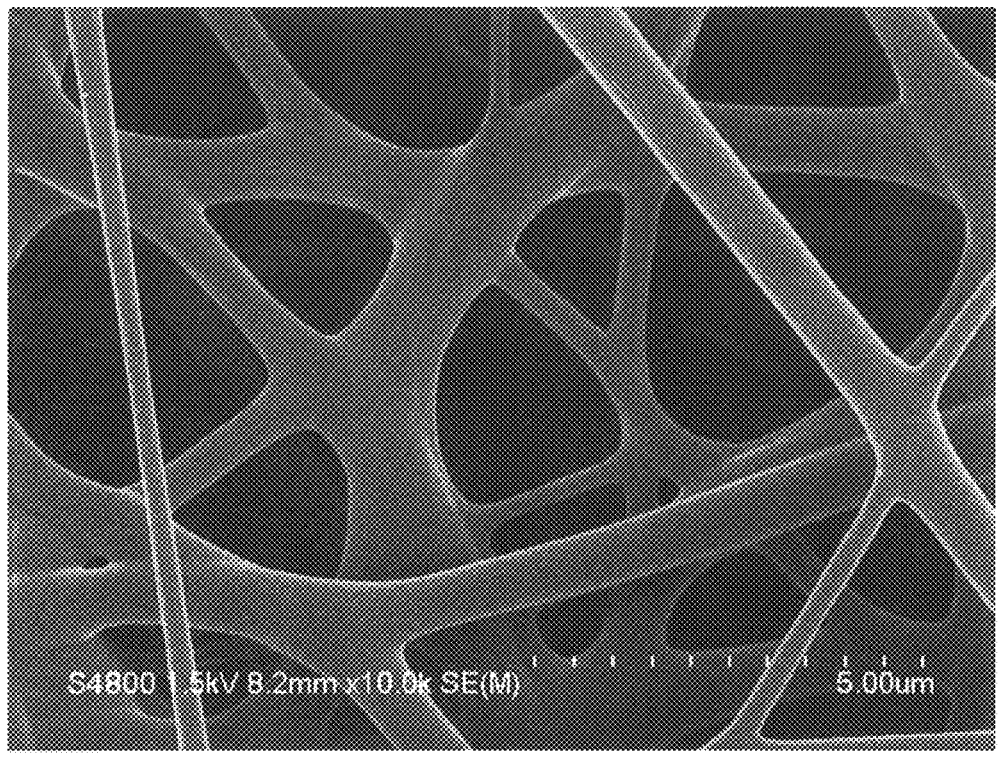
FIG. 11 is an SEM photograph of a fiber obtained from the composition for forming a fiber of Comparative Example 2, which was taken after a heat treatment at 180° C. for 10 min.
Figure 12:
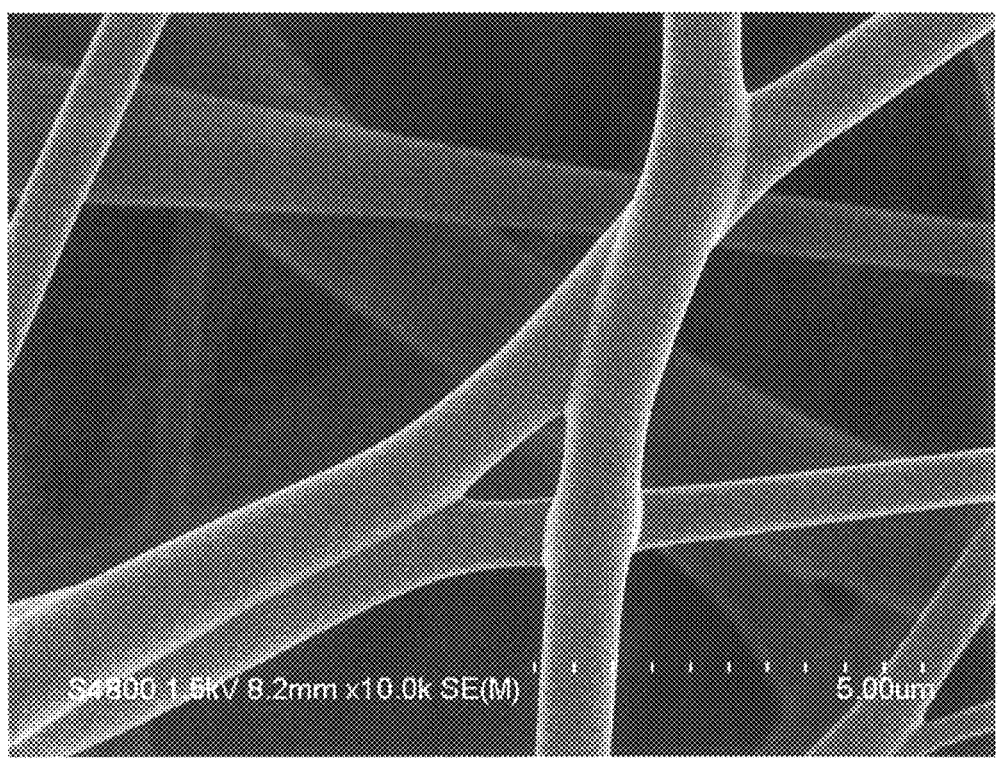
FIG. 12 is an SEM photograph of a fiber obtained from the composition for forming a fiber of Comparative Example 3, which was taken after a heat treatment at 180° C. for 10 min.

The composition for forming a fiber of the present invention (hereinafter to be also referred to as "the composition of the present invention") is mainly characterized in that it contains (A) a polymer compound containing a unit structure represented by the formula (1), (B) a crosslinking agent, (C) an acid compound, and (D) a solvent.

[Component A]

The composition of the present invention contains, as component A, a polymer compound containing a unit structure represented by the formula (1) (hereinafter to be also referred to as "the polymer compound of component A" or simply as "component A"). Since the unit structure represented by the formula (1) contained in component A has a hydroxy group in a side chain, when component A is spun together with a crosslinking agent and an acid compound, hydroxy groups undergo a crosslinking reaction via the crosslinking agent, and polymer compounds are crosslinked to give a fiber having organic solvent resistance. In addition, production of the polymer compound of component A is easier than that of polyvinyl alcohol and the like, wherein a hydroxy group is directly bonded to the main chain.

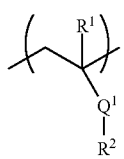
(1)

wherein
$R^1$ is a hydrogen atom or a methyl group,
$Q^1$ is an ester bond or an amide bond,
$R^2$ is an alkyl group having 1-10 carbon atoms or an aromatic hydrocarbon group having 6-10 carbon atoms, wherein at least one hydrogen atom is substituted by a hydroxy group.

The definition of each group of the formula (1) is described in detail in the following.

$R^1$ is a hydrogen atom or a methyl group.

$Q^1$ is an ester bond or an amide bond, and is preferably an ester bond from the aspect of the solubility of the polymer compound of component A in a solvent.

$R^2$ is an alkyl group having 1-10 carbon atoms or an aromatic hydrocarbon group having 6-10 carbon atoms, wherein at least one hydrogen atom is substituted by a hydroxy group. The alkyl group having 1-10 carbon atoms may be linear or branched chain, and concrete examples thereof include methyl group, ethyl group, propyl group, isopropyl group, butyl group, isobutyl group, sec-butyl group, tert-butyl group, pentyl group, isopentyl group, neopentyl group, tert-pentyl group, 1-ethylpropyl group, hexyl group, isohexyl group, 1,1-dimethylbutyl group, 2,2-dimethylbutyl group, 3,3-dimethylbutyl group, 2-ethylbutyl group, hexyl group, pentyl group, octyl group, nonyl group, decyl group and the like. The number of the carbon atoms of the alkyl group is preferably 1-6, more preferably 1-4.

Examples of the aromatic hydrocarbon group having 6-10 carbon atoms for $R^2$ include phenyl group, 1-naphthyl group, 2-naphthyl group and the like.

$R^2$ is preferably an alkyl group having 1-10 (more preferably 1-6, particularly preferably 1-4) carbon atoms wherein at least one hydrogen atom is substituted by a hydroxy group, or a phenyl group wherein at least one hydrogen atom is substituted by a hydroxy group from the aspects of the efficiency of the crosslinking reaction during fiber formation and biocompatibility of the produced fiber.

In a preferable unit structure represented by the formula (1), $R^1$ is a hydrogen atom or a methyl group, $Q^1$ is an ester bond, $R^2$ is an alkyl group having 1-10 (more preferably 1-6, particularly preferably 1-4) carbon atoms, wherein at least one hydrogen atom is substituted by a hydroxy group.

The unit structure represented by the formula (1) is preferably a unit structure represented by the formula (2).

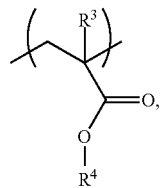
(2)

wherein $R^3$ is as defined for the above-mentioned $R^1$, $R^4$ is as defined for the above-mentioned $R^2$.

The polymer compound of component A may contain one kind of the unit structure represented by the formula (1), or two or more kinds thereof.

While the polymer compound of component A may contain a unit structure other than the unit structure represented by the formula (1) as long as the object of the present invention is not markedly impaired, the content ratio of the unit structure represented by the formula (1) to the total unit structure of the polymer compound of component A is preferably not less than 20 mol %, more preferably not less than 40 mol %, from the aspects of the efficiency of the crosslinking reaction during fiber formation and biocompatibility of the produced fiber.

The weight average molecular weight of component A is preferably 1,000-1,000,000, more preferably 5,000-500,000, particularly preferably 10,000-200,000, from the aspects of the organic solvent resistance of the fiber using the above-mentioned composition. In the present invention, the "weight average molecular weight" refers to a molecular weight based on polystyrene, which is measured by gel permeation chromatography (GPC).

Component A may be used alone, or two or more kinds thereof may be used in combination.

Component A can be produced by a method known per se or a method analogous thereto. For example, it can be produced by polymerizing monomers corresponding to the unit structure in a suitable solvent (e.g., 2-butanone etc.) by using a suitable polymerization initiator (e.g., dimethyl 2,2'-azobis (isobutyrate) etc.) and the like, but the method is not limited thereto. A commercially available product can also be used.

Examples of the monomer corresponding to the unit structure represented by the formula (1) include 2-hydroxyethyl (meth)acrylate (e.g., compound of CAS number: 868-77-9), 2-hydroxypropyl (meth)acrylate (e.g., compound of CAS number: 923-26-2), 4-hydroxybutyl (meth)acrylate (e.g., compound of CAS number: 2478-10-6), N-hydroxymethyl (meth)acrylamide (e.g., compound of CAS number: 923-02-4), N-(2-hydroxyethyl) (meth)acrylamide (e.g., compound of CAS number: 5238-56-2), N-(2-hydroxypropyl) (meth)acrylamide (e.g., compound of CAS number: 26099-09-2), p-hydroxy (meth)acrylic anilide (e.g., compound of CAS number: 19243-95-9) and the like. Preferred is 2-hydroxyethyl (meth)acrylate or 2-hydroxypropyl (meth)acrylate, and most preferred is 2-hydroxypropyl (meth)acrylate.

In the present invention, the (meth)acrylate compound refers to both an acrylate compound and a methacrylate compound. For example, (meth)acrylic acid refers to both acrylic acid and methacrylic acid.

The content ratio of component A in the composition of the present invention is preferably 5-50 wt %, more preferably 10-40 wt %, particularly preferably 14-35 wt %, from the aspects of the production of a fiber having an appropriate thickness, and the preservation stability of the composition of the present invention.

[Component B]

The composition of the present invention contains, as component B, a crosslinking agent (hereinafter to be also referred to as "the crosslinking agent of component B" or simply as "component B"). Component B when used in combination with the below-mentioned component C crosslinks hydroxy groups of component A via component B itself to impart organic solvent resistance to the fiber.

Examples of the crosslinking agent of component B include aminoplast crosslinking agents such as 1,3,4,6-tetrakis(methoxymethyl)glycoluril, 1,3,4,6-tetrakis(butoxy methyl)glycoluril and the like; phenoplast crosslinking agents such as 2,2-bis(4-hydroxy-3,5-dihydroxymethylphenyl)propane and the like; isocyanate crosslinking agents such as hexamethylene diisocyanate and the like; vinylether crosslinking agents such as 1,4-bis(vinyloxy)butane and the like; and the like.

Component B is preferably an aminoplast crosslinking agent, which is preferably 1,3,4,6-tetrakis(hydroxymethyl) glycoluril (CAS number: 5395-50-6), 1,3,4,6-tetrakis (methoxymethyl)glycoluril (CAS number: 17464-88-9), 1,3, 4,6-tetrakis(ethoxymethyl)glycoluril (CAS number: 65952-06-9), 1,3,4,6-tetrakis(1-methylethoxy)glycoluril (CAS number: 508220-69-7), 1,3,4,6-tetrakis(1,1-dimethylethoxy)glycoluril (CAS number: 547744-08-1) or 1,3,4,6-tetrakis(butoxy methyl)glycoluril (CAS number: 15968-37-3), more preferably 1,3,4,6-tetrakis(methoxymethyl) glycoluril.

Component B may be used alone, or two or more kinds thereof may be used in combination.

The crosslinking agent of component B can be produced by a method known per se or a method analogous thereto. In addition, a commercially available product may also be used.

The content ratio of component B in the composition of the present invention is preferably 0.1-5 wt %, more preferably 0.5-3 wt %, particularly preferably 0.7-2 wt %, from the aspects of the reaction efficiency with component A.

The weight ratio of component A and component B (weight of component A/weight of component B) in the composition of the present invention is preferably 5-65, more preferably 15-25, from the aspects of the reaction efficiency during fiber production.

[Component C]

The composition of the present invention contains, as component C, an acid compound (hereinafter to be also referred to as "the acid compound of component C" or simply as "component C"). The acid compound may be in the form of a salt; that is, the term "acid compound" in the present invention is a concept encompassing even a salt. Component C used in combination with component B can promote a crosslinking reaction of hydroxy groups of component A when the crosslinking reaction occurs via component B.

Examples of the acid compound of component C include organic acid compounds such as sulfonic acid compound, carboxylic acid compound and the like; inorganic acid compounds such as hydrochloric acid, phosphoric acid, sulfuric acid, nitric acid, hydrobromic acid and the like, and the like.

Component C is preferably an organic acid compound, more preferably a sulfonic acid compound. Examples of the sulfonic acid compound include p-toluenesulfonic acid, pyridinium p-toluenesulfonate, trifluoromethanesulfonic acid and the like, with preference given to p-toluenesulfonic acid or pyridinium p-toluenesulfonate.

Component C may be used alone, or two or more kinds thereof may be used in combination.

The acid compound of component C can be produced by a method known per se or a method analogous thereto. In addition, a commercially available product may also be used.

The content ratio of component C in the composition of the present invention is preferably 0.01-1.0 wt %, more preferably 0.05-0.5 wt %, particularly preferably 0.1-0.3 wt %, from the aspects of the crosslinking reaction rate and crosslinking reaction efficiency.

The weight ratio of component A and component C (weight of component A/weight of component C) contained in the composition of the present invention is preferably 20-120, more preferably 80-110, from the aspects of the crosslinking reaction rate and crosslinking reaction efficiency.

[Component D]

The composition of the present invention contains, as component D, a solvent (hereinafter to be also referred to as "the solvent of component D" or simply as "component D").

The solvent of component D is not particularly limited as long as it can uniformly dissolve or disperse at least the above-mentioned components A-C, and does not react with each component. From the aspects of solubility of components A-C, a polar solvent is preferable.

Examples of the polar solvent include water, methanol, ethanol, 2-propanol, propylene glycol monomethylether, acetone, dimethylformamide, dimethylacetamide, N-methylpyrrolidone and the like. Preferred for easy spinning of the composition is a mixed solvent of acetone and dimethylacetamide, and a preferable mixing ratio (wt %) thereof is acetone/dimethylacetamide=(90 wt %–60 wt %)/(10 wt %–40 wt %).

Component D may be used alone, or two or more kinds thereof may be used in combination.

The content ratio of component D in the composition of the present invention is preferably 50-95 wt %, more preferably 55-90 wt %, particularly preferably 60-85 wt %, from the aspects of the concentration of the composition of the present invention, and the preservation stability of the composition of the present invention.

The composition of the present invention may contain, as necessary besides components A-D, an additive generally used for a composition for forming a fiber as long as the object of the present invention is not markedly impaired. Examples of the additive include surfactant, rheology adjusting agent, chemical agent, fine particles and the like.

The composition of the present invention can be prepared by mixing the above-mentioned components A-D, or components A-D and the above-mentioned additive. The mixing method is not particularly limited, and a method known per se or a method analogous thereto can be used for mixing.

The composition of the present invention can be used for fiber formation. The kind of the fiber formed using the composition of the present invention is not particularly limited. For example, when used as a biocompatible material and the like, nanofiber, microfiber and the like are preferable, and nanofiber is more preferable. In the present invention, "nanofiber" refers to a fiber having a diameter of a nano meter order (e.g., 1-1000 nm), and the "microfiber" refers to a fiber having a diameter of a micro meter order (e.g., 1-1000 μm).

While the diameter of the fiber formed using the composition of the present invention can be appropriately adjusted according to the use of fiber and the like, it is preferably 1-1000 nm, more preferably 10-1000 nm, from the aspects of the concentration of the composition of the present invention, and easiness of spinning. In the present invention, the diameter of a fiber is measured by a scanning electron microscope (SEM).

2. Production Method of Fiber

The production method of the fiber of the present invention (hereinafter to be also referred to as "the method of the present invention") is mainly characterized in that it contains a step of spinning the composition of the present invention.

The spinning method of the composition of the present invention is not particularly limited as long as it can form a fiber. For example, melt blow method, composite melt spinning method, electrospinning method and the like can be mentioned, and electrospinning method is preferable from the aspect of the fiber forming ability.

Electrospinning method is a known spinning method, and can be performed using a known electrospinning apparatus. Various conditions such as the speed of discharging the composition of the present invention from the tip of a nozzle (e.g., needle etc.) (discharge speed); application voltage; the distance between the tip of a nozzle discharging the composition of the present invention and a substrate for receiving same (discharge distance) and the like can be appropriately determined according to the diameter of the fiber to be produced and the like. The discharge speed is generally 0.1-100 μl/min, preferably 0.5-50 μl/min, more preferably 1-20 μl/min. The application voltage is generally 0.5-80 kV, preferably 1-60 kV, more preferably 3-40 kV. The discharge distance is generally 1-60 cm, preferably 2-40 cm, more preferably 3-30 cm.

The method of the present invention preferably further includes a step of spinning the composition of the present invention, and heating the spun fiber at a particular temperature. By heating a spun fiber at a particular temperature, more superior resistance to organic solvents can be expressed.

The temperature for heating a spun fiber is generally 70-300° C. From the aspects of the reactivity of the crosslinking agent of component B, and the heat resistance of the polymer compound of component A, it is preferably 80-250° C., more preferably 90-200° C. When the temperature is less than 70° C., the crosslinking reaction of components A becomes insufficient, and the produced fiber tends to show lower resistance to organic solvents. When it exceeds 300° C., the polymer compound of component A itself undergoes decomposition or dissolution due to the heat and the like, and a fiber cannot be formed.

The heating method of the spun fiber is not particularly limited as long as heating at the above-mentioned heating temperature is possible, and a method known per se or a method analogous thereto can be appropriately used for heating. Specific examples of the heating method include a method using a hot plate, oven and the like under atmosphere, and the like.

While the heating time of the spun fiber can be appropriately determined according to the heating temperature and the like, it is preferably 1 min-48 hr, more preferably 5 min-36 hr, particularly preferably 10 min-24 hr from the aspects of crosslinking reaction rate, and production efficiency.

While the kind of the fiber to be produced by the method of the present invention (hereinafter to be also referred to as "the fiber of the present invention") is not particularly limited, for example, nanofiber, microfiber and the like are preferable, and nanofiber is more preferable, when used for a biocompatible material and the like.

The fiber of the present invention contains (A) a polymer compound containing a unit structure represented by the formula (1), (B) a crosslinking agent and (C) an acid compound. Each of components A-C contained in the fiber of the present invention is similar to that explained regarding the composition of the present invention, and preferable embodiments thereof are also similar.

While the diameter of the fiber of the present invention can be appropriately adjusted according to the use of fiber and the like, for example, when the fiber is used as a material of cell culture scaffold, it is preferably 1-1000 nm, more preferably 10-1000 nm, from the aspects of the efficiency of cell culture.

The length of the fiber of the present invention is desirably not less than 1000 times the diameter of the above-mentioned fiber.

The total weight of the fiber is, for example, 10 μg/cm$^2$ or more.

While the use of the fiber of the present invention is not particularly limited, the fiber is suitable as a biocompatible material since it has superior resistance to organic solvents, as shown in the below-mentioned Examples. In addition, the fiber of the present invention is suitable as a material of cell culture scaffold, since it has sufficient function as cell culture scaffold.

3. Biocompatible Material

The biocompatible material of the present invention is mainly characterized in that it contains the fiber of the present invention. In the present invention, the "biocompatible material" refers to a material that does not exert an adverse influence on living organisms and can be utilized as a medical material, a cosmetic material and the like.

While the kind of the biocompatible material of the present invention is not particularly limited, for example, material of cell culture scaffold, wound coating material, face mask (for cosmetic, hygienic management) and the like can be mentioned. Of these, the material of cell culture scaffold is preferable since the fiber of the present invention has sufficient function as cell culture scaffold.

The biocompatible material of the present invention can be produced using the fiber of the present invention as one of the starting materials and according to a method known per se or a method analogous thereto.

EXAMPLES

While specific examples of the present invention are explained below, the present invention is not limited in any way by the examples.

[Measurement of Weight Average Molecular Weight of Polymer Compounds 1-3]

The weight average molecular weight of the following polymer compounds 1-3 is measured by gel permeation chromatography (GPC). The apparatus used for the measurement and measurement conditions are as follows.
  apparatus: TOSOH HLC-8320GPC system
  column: Shodex (registered trade mark) KF-803L, KF-802 and KF-801
  column temperature: 40° C.
  eluent: DMF
  flow rate: 0.6 ml/min
  detector: RI
  standard sample: polystyrene <Synthesis of Polymer Compounds 1-3>
(Polymer Compound 1)

2-Hydroxypropyl methacrylate (manufactured by Tokyo Chemical Industry Co., Ltd.) (50.0 g), and dimethyl 2,2'-azobis (isobutyrate) (manufactured by Wako Pure Chemical Industries, Ltd.) (3.0 g) were dissolved in 2-butanone (123.7 g), and added dropwise under a nitrogen atmosphere to 2-butanone (88.4 g) heated under reflux. After the completion of the dropwise addition, the mixture was reacted for 17 hr with heating under reflux. Thereafter, the reaction mixture was concentrated to the amount of about 100 ml, diethyl ether was added to allow for precipitation of the polymer. The polymer was collected by filtration, and dried under reduced pressure to give polymer compound 1 (47.3 g). The weight average molecular weight was 11,800 based on polystyrene.

(Polymer Compound 2)

2-Hydroxypropyl methacrylate (manufactured by Tokyo Chemical Industry Co., Ltd.) (50.0 g), and dimethyl 2,2'-azobis (isobutyrate) (manufactured by Wako Pure Chemical Industries, Ltd.) (0.5 g) were dissolved in 2-butanone (117.8 g), and added dropwise under a nitrogen atmosphere to 2-butanone (84.2 g) heated under reflux. After the completion of the dropwise addition, the mixture was reacted for 17 hr with heating under reflux. Thereafter, the reaction mixture was concentrated to the amount of about 100 ml, diethyl ether was added to allow for precipitation of the polymer. The polymer was collected by filtration, and dried under reduced pressure to give polymer compound 2 (48.8 g). The weight average molecular weight was 35,600 based on polystyrene.

(Polymer compound 3)

2-Hydroxypropyl methacrylate (manufactured by Tokyo Chemical Industry Co., Ltd.) (50.0 g), and dimethyl 2,2'-azobis (isobutyrate) (manufactured by Wako Pure Chemical Industries, Ltd.) (0.05 g) were dissolved in 2-butanone (116.8 g), and added dropwise under a nitrogen atmosphere to 2-butanone (83.4 g) heated under reflux. After the completion of the dropwise addition, the mixture was reacted for 17 hr with heating under reflux. Thereafter, the reaction mixture was concentrated to the amount of about 150 ml, diethyl ether was added to allow for precipitation of the polymer. The polymer was collected by filtration, and dried under reduced pressure to give polymer compound 3 (31.6 g). The weight average molecular weight was 153,000 based on polystyrene.

Preparation of Composition for Forming Fiber (Solution)

Example 1

Polymer compound 1 (0.80 g), 1,3,4,6-tetrakis(methoxymethyl)glycoluril (0.04 g), p-toluenesulfonic acid (0.008 g), dimethylacetamide (0.360 g), and acetone (1.08 g) were mixed, and the mixture was stirred by mix rotor VMR-5 (manufactured by AS ONE Corporation) at 100 rpm until dissolution to give the composition of Example 1 for forming a fiber. The content ratio of polymer compound 1 in the composition of Example 1 for forming a fiber was about 35 wt %.

Example 2

Polymer compound 2 (0.70 g), 1,3,4,6-tetrakis(methoxymethyl)glycoluril (0.035 g), p-toluenesulfonic acid (0.007 g), dimethylacetamide (0.40 g), and acetone (1.19 g) were mixed, and the mixture was stirred by mix rotor VMR-5 (manufactured by AS ONE Corporation) at 100 rpm until dissolution to give the composition of Example 2 for forming a fiber. The content ratio of polymer compound 2 in the composition of Example 2 for forming a fiber was about 30 wt %.

Example 3

Polymer compound 3 (0.70 g), 1,3,4,6-tetrakis(methoxymethyl)glycoluril (0.035 g), pyridinium p-toluenesulfonate (0.007 g), dimethylacetamide (0.40 g), and acetone (1.2 g) were mixed, and the mixture was stirred by mix rotor VMR-5 (manufactured by AS ONE Corporation) at 100 rpm until dissolution to give the composition of Example 3 for forming a fiber. The content ratio of polymer compound 3 in the composition of Example 3 for forming a fiber was about 30 wt %.

Example 4

Polymer compound 3 (0.70 g), 1,3,4,6-tetrakis(methoxymethyl)glycoluril (0.035 g), pyridinium p-toluenesulfonate (0.007 g), dimethylacetamide (0.60 g), and acetone (1.8 g) were mixed, and the mixture was stirred by mix rotor VMR-5 (manufactured by AS ONE Corporation) at 100 rpm until dissolution to give the composition of Example 4 for forming a fiber. The content ratio of polymer compound 3 in the composition of Example 4 for forming a fiber was about 22 wt %.

Example 5

Polymer compound 3 (0.35 g), 1,3,4,6-tetrakis(methoxymethyl)glycoluril (0.018 g), pyridinium p-toluenesulfonate (0.004 g), dimethylacetamide (0.49 g), and acetone (1.5 g) were mixed, and the mixture was stirred by mix rotor VMR-5 (manufactured by AS ONE Corporation) at 100 rpm until dissolution to give the composition of Example 5 for forming a fiber. The content ratio of polymer compound 3 in the composition of Example 5 for forming a fiber was about 15 wt %.

Example 6

Polymer compound 3 (0.60 g), 1,3,4,6-tetrakis(methoxymethyl)glycoluril (0.030 g), pyridinium p-toluenesulfonate (0.006 g), dimethylacetamide (0.46 g), and acetone (1.39 g) were mixed, and the mixture was stirred by mix rotor VMR-5 (manufactured by AS ONE Corporation) at 100 rpm until dissolution to give the composition of Example 6 for forming a fiber. The content ratio of polymer compound 3 in the composition of Example 6 for forming a fiber was about 24 wt %.

Comparative Example 1

Polymer compound 3 (0.50 g), p-toluenesulfonic acid (0.005 g), dimethylacetamide (0.440 g), and acetone (1.32 g) were mixed, and the mixture was stirred by mix rotor VMR-5 (manufactured by AS ONE Corporation) at 100 rpm until dissolution to give the composition of Comparative Example 1 for forming a fiber. The content ratio of polymer compound 3 in the composition of Comparative Example 1 for forming a fiber was about 22 wt %.

Comparative Example 2

Polymer compound 3 (0.50 g), 1,3,4,6-tetrakis(methoxymethyl)glycoluril (0.025 g), dimethylacetamide (0.434 g), and acetone (1.30 g) were mixed, and the mixture was stirred by mix rotor VMR-5 (manufactured by AS ONE Corporation) at 100 rpm until dissolution to give the composition of Comparative Example 2 for forming a fiber. The content ratio of polymer compound 3 in the composition of Comparative Example 2 for forming a fiber was about 22 wt %.

Comparative Example 3

Polymer compound 3 (0.50 g), dimethylacetamide (0.443 g), and acetone (1.33 g) were mixed, and the mixture was stirred by mix rotor VMR-5 (manufactured by AS ONE Corporation) at 100 rpm until dissolution to give the composition of Comparative Example 3 for forming a fiber. The content ratio of polymer compound 3 in the composition of Comparative Example 3 for forming a fiber was about 22 wt %.

TABLE 1

| | polymer compound (component A) | weight average molecular weight of component A | content ratio (wt %) of component A | crosslinking agent (component B) | acid compound (component C) | solvent (component D) |
|---|---|---|---|---|---|---|
| Ex. 1 | 1 | 11,800 | 35 | PL-LI | PTSA | DMAc/acetone |
| Ex. 2 | 2 | 35,600 | 30 | PL-LI | PTSA | DMAc/acetone |
| Ex. 3 | 3 | 153,000 | 30 | PL-LI | PTSA | DMAc/acetone |
| Ex. 4 | 3 | 153,000 | 22 | PL-LI | PyPTS | DMAc/acetone |
| Ex. 5 | 3 | 153,000 | 15 | PL-LI | PyPTS | DMAc/acetone |
| Ex. 6 | 3 | 153,000 | 24 | PL-LI | PyPTS | DMAc/acetone |
| Comp. Ex. 1 | 3 | 153,000 | 22 | — | PTSA | DMAc/acetone |
| Comp. Ex. 2 | 3 | 153,000 | 22 | PL-LI | — | DMAc/acetone |
| Comp. Ex. 3 | 3 | 153,000 | 22 | — | — | DMAc/acetone |

Note) PL-LI: 1,3,4,6-tetrakis(methoxymethyl)glycoluril, PTSA: p-toluenesulfonic acid, PyPTS: pyridinium p-toluenesulfonate, DMAc: dimethylacetamide

[Production Method of Fiber by Electrospinning Method]

In the following Experimental Examples 1-3, fibers were produced by an electrospinning method by using Esprayer ES-2000 (manufactured by Fuence Co., Ltd.). The composition for forming a fiber was filled in a 1 ml lock-type glass syringe (manufactured by AS ONE Corporation), and a lock-type metallic needle 24 G with needle length of 13 mm (manufactured by Musashi engineering) was attached. The distance from the needle tip to the substrate for receiving the fiber (discharge distance) was set to 20 cm. The applied voltage was 25 kV, and the discharge speed was 10 µl/min.

[Confirmation Method of Fiber Form]

In the following Experimental Examples 1-3, the fiber form was confirmed by vapor depositing Pt—Pd on the fiber for 1 min by ion sputter (E-1030, manufactured by Hitachi High-Technologies Corporation), and observing same under a scanning electron microscope (SEM) (S-4800, manufactured by Hitachi High-Technologies Corporation) at magnification ×10,000.

When the fiber form was maintained, "good" is indicated, and when the fiber form was not maintained, "not good" is indicated.

[Measurement Method of Fiber Diameter]

In the following Experimental Examples 1-3, the fiber diameter (thickness of fiber) was measured using a scanning electron microscope (SEM) (S-4800, manufactured by Hitachi High-Technologies Corporation), by taking and preserving images at magnification ×10,000 and measuring by the attached length measuring tool.

Experimental Example 1: Heat Treatment and Solvent Resistance Test

The compositions of Examples 1-5 and Comparative Examples 1-3 for forming a fiber were spun by an electrospinning method immediately after preparation, the obtained fibers were heat-treated under conditions shown in Table 2, and the fiber form after the heat treatment was confirmed.

The fibers after the heat treatment were immersed in acetone for 10 sec, the fiber form was confirmed, and the fiber diameter was measured.

The results are shown in Table 2 (fiber form after heat treatment) and Table 3 (fiber form and fiber diameter after immersion in acetone).

TABLE 2

| | temperature | | | |
|---|---|---|---|---|
| | 110° C. | | 180° C. | |
| | time | | | |
| | 10 min | 24 hr | 10 min | 30 min |
| Ex. 1 | good | good | — | — |
| Ex. 2 | — | — | good | — |
| Ex. 3 | — | — | — | good |
| Ex. 4 | — | — | — | good |
| Ex. 5 | good | — | — | — |
| Comp. Ex. 1 | — | good | good | — |
| Comp. Ex. 2 | — | — | good | — |
| Comp. Ex. 3 | — | — | good | — |

TABLE 3

| | temperature | | | |
|---|---|---|---|---|
| | 110° C. | | 180° C. | |
| | time | | | |
| | 10 min | 24 hr | 10 min | 30 min |
| Ex. 1 | good about 230 nm | good about 200 nm | — | — |
| Ex. 2 | — | — | good about 270 nm | — |
| Ex. 3 | — | — | — | good about 950 nm |

TABLE 3-continued

| | temperature | | | |
|---|---|---|---|---|
| | 110° C. | | 180° C. | |
| | time | | | |
| | 10 min | 24 hr | 10 min | 30 min |
| Ex. 4 | — | — | — | good about 250 nm |
| Ex. 5 | good about 70 nm | — | — | — |
| Comp. Ex. 1 | — | good about 400 nm | good about 330 nm | — |
| Comp. Ex. 2 | — | — | not good | — |
| Comp. Ex. 3 | — | — | not good | — |

The fibers produced using the compositions of Examples 1-5 for forming a fiber showed a good form irrespective of the molecular weight of the polymer compound and the content of the polymer compound.

The results of Example 1 and Example 5 reveal that a fiber produced by electrospinning the composition for forming a fiber of the present invention retains resistance to organic solvents even when the heat treatment is performed at a low temperature for a short time (e.g., 110° C. for 10 min).

In other words, when the composition for forming a fiber of the present invention is spun by an electrospinning method to produce a fiber, a heat treatment at not less than 110° C. is more desirable to provide a fiber superior in the resistance to organic solvents.

Also, it was suggested that, when electrospinning is performed under the above-mentioned conditions, the diameter of the produced fiber depends on the weight average molecular weight of the polymer compound of component A, and the content ratio of the polymer compound of component A in the composition for forming a fiber. Therefore, a fiber having a desired fiber diameter can be obtained by adjusting the weight average molecular weight of the polymer compound of component A, and the content ratio of the polymer compound of component A in the composition for forming a fiber.

Experimental Example 2: Room Temperature Preservation Stability Test

The compositions of Examples 1, 2, 4 and Comparative Example 1 for forming a fiber were preserved at 23° C. for 3 weeks, and spun by an electrospinning method. The obtained fibers were heat-treated under conditions shown in Table 4, and the fiber form after the heat treatment was confirmed.

The fibers after the heat treatment were immersed in acetone for 10 sec, the fiber form was confirmed, and the fiber diameter was measured.

The results are shown in Table 4 (fiber form after heat treatment) and Table 5 (fiber form and fiber diameter after immersion in acetone).

TABLE 4

| | temperature | | | |
|---|---|---|---|---|
| | 110° C. | | 180° C. | |
| | time | | | |
| | 10 min | 24 hr | 10 min | 30 min |
| Ex. 1 | good | — | — | — |
| Ex. 2 | — | — | good | — |
| Ex. 4 | — | — | — | good |
| Comp. Ex. 1 | — | good | not good | — |

TABLE 5

| | temperature | | | |
|---|---|---|---|---|
| | 110° C. | | 180° C. | |
| | time | | | |
| | 10 min | 24 hr | 10 min | 30 min |
| Ex. 1 | good about 210 nm | — | — | — |
| Ex. 2 | — | — | good about 240 nm | — |
| Ex. 4 | — | — | — | good about 300 nm |
| Comp. Ex. 1 | — | good about 380 nm | not good | — |

It was confirmed that the compositions of Examples 1, 2 and 4 for forming a fiber can form a fiber having a good form even after preservation at 23° C. for 3 weeks, and are superior in the preservation stability at room temperature.

On the other hand, the fiber obtained from the composition of Comparative Example 1 for forming a fiber showed good fiber form after heating at 110° C., but could not maintain the good fiber form after heating at 180° C.

Therefrom it is assumed that the composition of Comparative Example 1 for forming a fiber shows unstable fiber formation depending on the preservation conditions and heat treatment conditions.

As the cause thereof, it is considered that the heat treatment at 180° C. of the fiber obtained from the composition of Comparative Example 1 for forming a fiber containing no crosslinking agent resulted in the dissolution of the fiber before sufficient progress of the crosslinking reaction, since the fiber cannot endure the heat.

Experimental Example 3: Cell Culture Evaluation

The composition of Example 6 for forming a fiber was spun by an electrospinning method, and cell culture on the obtained fiber was evaluated. In the following, the $CO_2$ concentration (%) of $CO_2$ incubator is shown in % by volume of $CO_2$ in the atmosphere. PBS means phosphate buffered saline (manufactured by Sigma-Aldrich Japan), FBS means fetal calf serum (manufactured by Biological Industries).

[Preparation of Cell]

As the cell, human embryonic kidney cell line Hek293 (manufactured by DS Pharma Biomedical Co., Ltd.) was used. The medium used for cell culture was EMEM (Eagle's Minimum Essential Medium) medium (manufactured by Wako Pure Chemical Industries, Ltd.) containing 10% (v/v) FBS and 1% (v/v) NEAA (Non-Essential Amino Acids) (manufactured by GIBCO). The cells were subjected to standing culture using a diameter 10 cm petri dish (medium 10 mL) for 2 days or longer in a $CO_2$ incubator at 37° C.

while maintaining 5% carbon dioxide concentration. The cells were washed with PBS (10 mL), trypsin-EDTA (ethylenediaminetetraacetic acid) solution (manufactured by Wako Pure Chemical Industries, Ltd.) (1 mL) was added to detach the cells, which were suspended in the above-mentioned medium (10 ml). The suspension was centrifuged (manufactured by TOMY SEIKO Co., Ltd., LC-200, 1000 rpm/3 min, room temperature), the supernatant was removed, and the above-mentioned medium was added to prepare a cell suspension.

Production of Fiber of Example 6

The composition of Example 6 for forming a fiber was spun by an electrospinning method, blown against a glass substrate for 10 min, and heat-treated at 180° C. for 30 min. As the glass substrate, TEMPAX Float (registered trademark) (⌀12 mm, thickness 1 mm) was used. The obtained fiber was washed with ethanol, air-dried, and the fiber form was confirmed by a scanning electron microscope (SEM). The diameter of the fiber obtained from the composition of Example 6 for forming a fiber was about 500 nm.

In the following, the glass substrate on which the composition of Example 6 for forming a fiber was spun to form a fiber is conveniently referred to as "the fiber substrate of Example 6".

[Cell Culture]

The fiber substrate of Example 6, and an untreated glass substrate as a control were set in a 24 well flat-bottom microplate (manufactured by Corning Incorporated), and the microplate was immersed in EMEM medium (manufactured by Wako Pure Chemical Industries, Ltd.) containing 1% (v/v) penicillin/streptomycin solution (manufactured by GIBCO) for 15 min. The medium was removed, and a cell suspension of Hek293 (human embryonic kidney cell) prepared to $1.0 \times 10^5$ cells/well was added at 1 mL each. Thereafter, the microplate was stood in a $CO_2$ incubator at 37° C. for 24 hr while maintaining 5% carbon dioxide concentration.

[Cell Number Count Using Trypan Blue]

After cell culture for 24 hr, the supernatant on the fiber substrate of Example 6 and the glass substrate used for the cell culture were removed, and the cells were washed with PBS (2 mL). PBS was removed, and trypsin-EDTA solution (manufactured by Wako Pure Chemical Industries, Ltd.) (300 μL) was added. After standing in a $CO_2$ incubator at 37° C. for 5 min, 1 mL of EMEM medium containing 10% (v/v) FBS was added, and the cells were detached by pipetting. The detached cells were transferred into a 1.5 mL micro test tube (manufactured by Eppendorf), the same amount of Trypan Blue staining solution (manufactured by GIBCO) was added to a part of the culture medium, and the viable cell number was measured by a cell counter (manufactured by Bio-Rad, TC20).

[Cell Number Count Using WST-8]

After cell culture for 24 hr, the supernatant on the fiber substrate of Example 6 and the glass substrate used for the cell culture were removed, and the cells were washed with PBS (2 mL). PBS was removed, 1 mL of EMEM medium containing 10% (v/v) FBS and 1% (v/v) NEAA (manufactured by GIBCO) was added, and 100 μL of WST-8 reagent (manufactured by KISHIDA CHEMICAL Co., Ltd.) was added. After standing in a $CO_2$ incubator at 37° C. for 100 min, the reaction solution (100 μL) was transferred to a 96 well flat-bottom microplate, and the absorbance at 450 nm was measured by an absorption spectrometer (manufactured by Molecular Devices, SpectraMax).

The results of each cell number measurement are shown Table 6 (mean of n=3).

TABLE 6

|  | cell number ($\times 10^4$ cells/mL) (Trypan Blue) | absorbance (450 nm) (WST-8) |
|---|---|---|
| fiber substrate of Ex. 6 | 11.3 | 0.12 |
| glass substrate | 8.6 | 0.08 |

It is clear from the results of Table 6 that cell proliferation occurs on the fiber substrate of Example 6, the fiber formed from the composition of Example 6 for forming a fiber is harmless to living organisms. Furthermore, when cultured on the fiber substrate of Example 6, the cell number increased as compared to that on a glass substrate. Particularly, in the cell number measurement by WST-8, 50% increase in the cell number was found. In the cell number measurement using Trypan Blue, about 30% increase in the cell number was found, even though not all cells were recovered to count the cell number.

INDUSTRIAL APPLICABILITY

According to the present invention, a composition for forming a fiber, which is for the production of a fiber having organic solvent resistance which can be produced conveniently, a fiber obtained by spinning the composition, and a biocompatible material containing the fiber can be provided.

According to the present invention, moreover, a composition for forming a fiber, which is superior in room temperature preservation stability can also be provided.

Furthermore, a composition for forming a fiber, which is for the production of a fiber having a sufficient function as a cell culture scaffold, a fiber obtained by spinning the composition, and a biocompatible material containing the fiber can be provided.

This application is based on patent application No. 2013-180382 filed in Japan (filing date: Aug. 30, 2013), the contents of which are encompassed in full herein.

The invention claimed is:

1. A method of producing a fiber, comprising spinning a composition comprising
   (A) a polymer compound consisting of monomer units represented by formula (1) that are the same or different

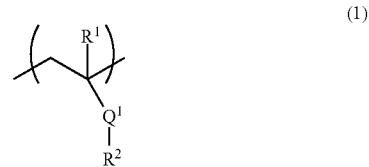

wherein
   $R^1$ is a hydrogen atom or a methyl group,
   $Q^1$ is an ester bond or an amide bond,
   $R^2$ is an alkyl group having 1-10 carbon atoms or an aromatic hydrocarbon group having 6-10 carbon atoms, wherein at least one hydrogen atom is substituted by a hydroxy group,
   (B) a crosslinking agent,
   (C) an acid compound, and
   (D) a solvent
to form a fiber.

2. The method according to claim 1, wherein the spinning is electrospinning.

3. The method according to claim 1, further comprising heating the fiber at 70-300° C.

4. A fiber produced by the method according to claim 1.

5. A biocompatible material comprising the fiber according to claim 4.

* * * * *